Aug. 21, 1934.      M. H. CARPENTER ET AL      1,971,209
MOTOR VEHICLE ASSEMBLY
Filed April 4, 1929      2 Sheets-Sheet 1
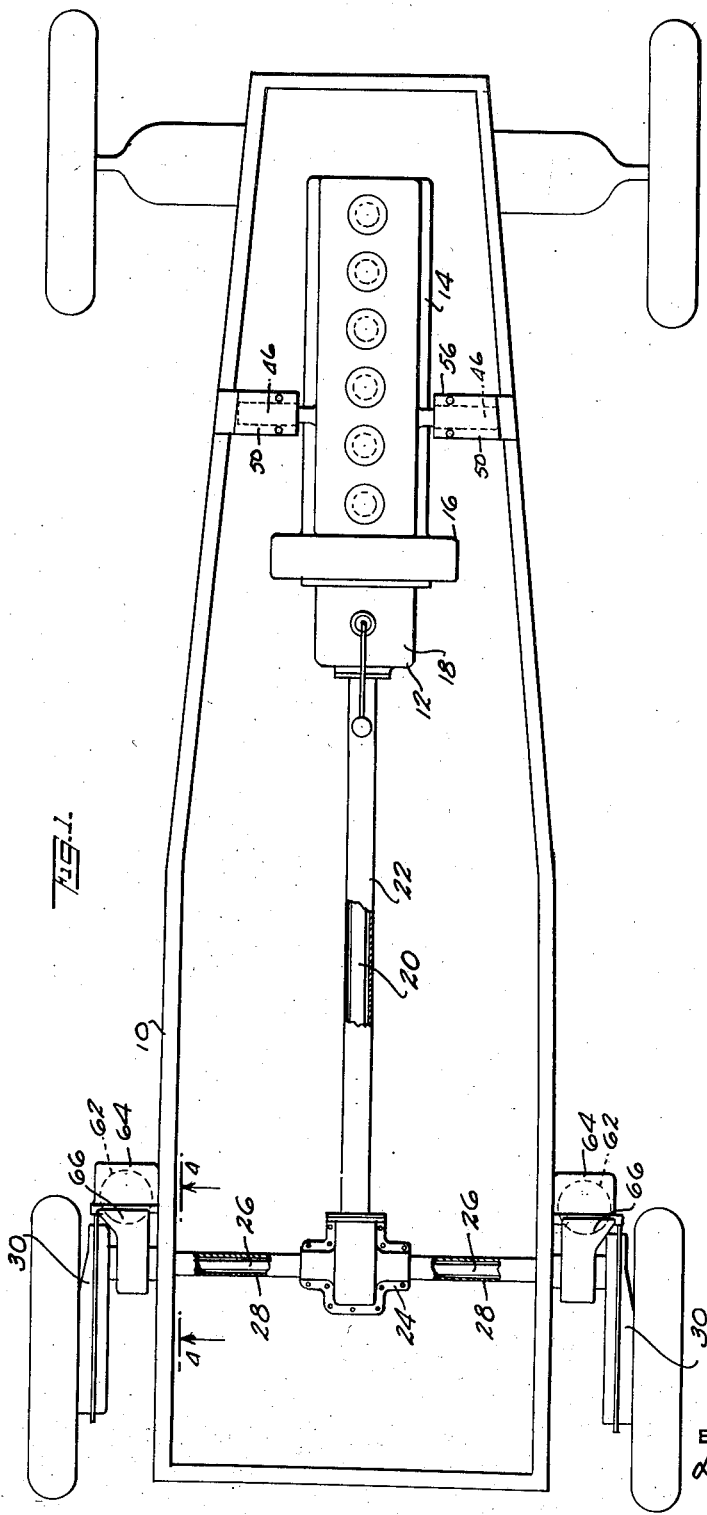
INVENTORS
Miles H. Carpenter
BY Charles B. Kirkham
ATTORNEYS

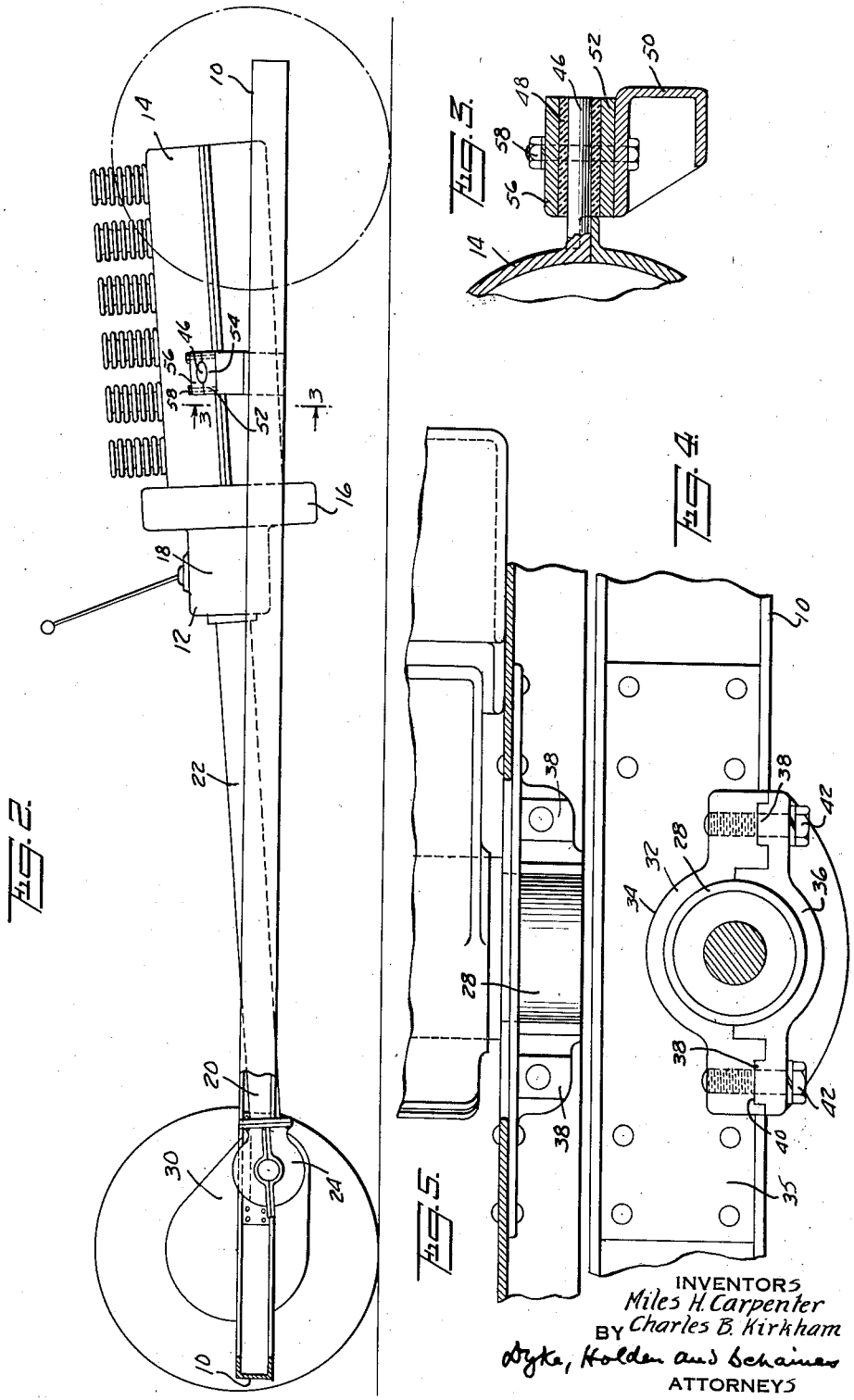

Patented Aug. 21, 1934

1,971,209

UNITED STATES PATENT OFFICE 1,971,209

MOTOR VEHICLE ASSEMBLY

Miles H. Carpenter, New Rochelle, and Charles B. Kirkham, Freeport, N. Y.

Application April 4, 1929, Serial No. 352,416

6 Claims. (Cl. 180—64)

Our invention relates to motor vehicles and particularly to a construction by which the assembly of the driving mechanism with the body or frame is facilitated.

According to our invention, the engine, clutch, transmission, propeller shaft, differential, wheel driving shafts, and preferably also the rear wheel drive with the housings for these parts, are constructed as a complete self-supporting unit of substantially T-formation, which can be finished complete, can be transported in compact form and readily bolted to the frame or body suitably constructed to receive the same.

With the foregoing and related objects in view, our invention will be best understood from the following description of the illustrative embodiment shown in the accompanying drawings.

Fig. 1 is a diagrammatic plan view showing a mechanical unit attached to a motor vehicle.

Fig. 2 is a side view of the arrangement shown in Fig. 1.

Fig. 3 is a detailed sectional view along substantially the line 3, 3 of Fig. 2.

Fig. 4 is a detailed sectional view on line 4, 4 of Fig. 1; and

Fig. 5 is a bottom plan view of Fig. 4 with the frame in section and the clamp cap removed.

Reference numeral 10 designates the vehicle part to which the mechanical unit is to be attached and which may consist of a frame, or body, or combination of frame and body, a conventional chassis frame being indicated for this purpose in the drawings. Reference numeral 12 is used to designate generally the mechanical unit constructed to be assembled bodily with the frame 10. The said unit 12 comprises the actuating mechanism, including the engine 14 with the fly wheel housing 16 containing the clutch mechanism, transmission 18, propeller shaft 20 in its housing 22, differential 24 in its casing connected to said housing 22, and the drive shafts 26, 26 with their housings 28, 28 connected to the differential casing 24, and may also, if desired, have completely assembled therewith the rear wheel driving mechanisms 30, 30 or, if desired, as when shipping to an assembly plant where skilled help and special tool equipment are available, said mechanism 30, 30 may be disconnected and shipped separately and attached at the time the assembly is made.

Independently sprung wheel mountings which may be adapted to be used as a part of the mechanical unit 12 of the present invention are described and claimed in our copending application Serial No. 352,416, which issued as Patent No. 1,943,721 under date of January 16th, 1934.

The member 10 is prepared for attachment thereto of the unit 12, as by being made with the top half 32 of a drive shaft housing clamp 34 comprising a reinforcing plate 35 fastened in place on each side of frame 10 near the rear thereof and adapted to receive the tubular driveshaft housings 28. If, as may be done, the frame is cut away in this region on its under side, which would reduce its strength, the original strength may be restored or increased by providing the under half or cap member 36 of the driveshaft housing clamp 34 with bosses or projections 38 to enter recesses 40 in the top clamp member 32 so that when the lower member is secured in place, as by bolts 42, the frame will be strengthened and reinforced.

Means are also provided on the frame for attachment and support of the T-shaped unit at or near the center of gravity of the parts constituting the stem portion of the T-shaped formation extending from engine to driveshaft. In the form shown, the engine is provided with laterally projecting arms 46 on each side, and these arms are preferably enclosed in rubber sleeves 48 to serve as a vibration insulator between the engine and the frame.

The engine mounting is preferably supported on frame 10 or the vehicle body, as by means of bracket 50, and may comprise the lower half clamp member 52 having a recess at 54 for the reception of the rubber armored arms 46. The top half, or cap, 56 of the clamp may be secured in place as by means of bolts 58.

With the power and drive unit constructed as described and with the frame or body prepared for its reception as described, and with the proper bolts and clamp parts available, all that is necessary to assemble the substantially T-shaped power and drive unit to the frame or body is to bring them together, either by elevating the former from below or, preferably, by lowering the body or frame on the drive mechanism, the driveshaft tubes 28 being received in the clamp member 34 and the arms 46 on the engine being inserted in the clamp portions 52, after which the clamp caps are put on and bolted in place.

The springing of the independently sprung rear wheels, described in detail in our companion application, can be taken care of at the same time that this assembly is made, as by inserting the cushioning ball 62 within the receptacle 64 provided therefor on the frame 10 and forcing the driveshaft forward so that the forwardly projecting ends of the lever members 66 engage with and receive the projecting portions of the rubber ball 62.

The present invention is not concerned with the front wheel construction and steering arrangements, which may be of any suitable kind.

With the parts constructed for assembly in the manner described, it is of course readily possible to utilize this feature not merely for original assembly, but same affords a convenient way of removing the power unit for repair or replacement of any part thereof, thereby greatly facilitating service and maintenance operation.

We claim:

1. A motor vehicle comprising a body portion having a recessed frame portion, a clamping member secured to and reinforcing said frame portion and having a recess aligned with said first-named recess, a driveshaft housing received within said recesses, a clamping member having a keyed engagement with said reinforcing member and a recess therein cooperating with the recess in said first-named clamping member to enclose said housing, and means for securing said clamping members together.

2. A motor vehicle comprising a body portion having a plurality of substantially half clamping members on each side thereof, a motive unit comprising a substantially rigid T-shaped housing member, means for supporting the stem portion of said T-shaped member substantially centrally of the vehicle body and rigid therewith, and supplementary substantially half clamping means for clamping the transverse portion of the rigid motive unit housing rigidly to the supplementary clamping members on the body portion.

3. A motor vehicle comprising a body portion having longitudinally extending lateral members and a motive and transmission unit including a motor and a T-shaped housing having the stem portion thereof connected to the motor to form a rigid unitary structure, attaching members on said motor, clamping members upon each lateral member adapted to receive said attaching members for rigidly retaining the forward end of said structure in place, and members for rigidly clamping the transverse portion of said structure to the lateral members at the rear thereof and serving to brace the same.

4. A motor vehicle comprising a body portion having longitudinally extending frame portions, recessed clamping members thereon substantially in line with said frame portions and reinforcing the same, clamping members on said frame portion forwardly of said first named clamping members forming recessed supports, a motive and transmission unit including a motor and a T-shaped housing having the stem portion connected to the motor to form a rigid unitary structure, means on said motor for supporting the same in said recessed supports, the transverse rear portions of said structure being received in said rear recessed clamping members, clamping members cooperating with said rear and forward clamping members, and means for securing each pair of clamping members together to retain said structure in place reinforcing said body portion.

5. A motor vehicle comprising a body portion having longitudinally extending lateral frame members, said frame members having reinforcing recessed clamping portions therein at the lower side thereof and substantially in line therewith, relatively elevated recessed clamping supports upon said frame members in advance of said first named clamping portions, a motive and transmission unit including a motor and a T-shaped housing having the stem portion connected to the motor to form a rigid unitary structure, means on said motor for engaging said elevated supports, means for securing the same thereto, and recessed clamping members cooperating with the rear recessed clamping portions for securing the transverse portion of the structure therebetween up against said frame members, whereby to reinforce said body portion.

6. A motor vehicle comprising a preassembled motive plant including a driveshaft housing and constituting a rigid unit, a frame portion and means for rigidly clamping said unit to said frame portion, said means including a recess in the frame, a reinforcing member secured to said frame portion and having a recess aligned with said first-named recess, said driveshaft housing adapted to be received within said recesses, and a clamping member secured to said reinforcing member about said driveshaft housing.

MILES H. CARPENTER.
CHARLES B. KIRKHAM.